United States Patent
Shimada et al.

(10) Patent No.: US 8,237,741 B2
(45) Date of Patent: Aug. 7, 2012

(54) IMAGE PROCESSING APPARATUS, IMAGE PROCESSING METHOD, AND IMAGE PROCESSING PROGRAM

(75) Inventors: Makiko Shimada, Kanagawa (JP); Naomasa Takahashi, Chiba (JP); Jun Hirai, Tokyo (JP); Yukio Takeyari, Kanagawa (JP); Makoto Tsukamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 945 days.

(21) Appl. No.: 12/265,159

(22) Filed: Nov. 5, 2008

(65) Prior Publication Data
US 2009/0115798 A1 May 7, 2009

(30) Foreign Application Priority Data

Nov. 7, 2007 (JP) ................................. 2007-289218

(51) Int. Cl.
*G09G 5/00* (2006.01)
(52) U.S. Cl. ........ 345/621; 345/620; 345/625; 345/629; 345/698; 382/298; 382/299
(58) Field of Classification Search .......... 345/619–621, 345/625, 629–641, 698; 382/294, 298–300
See application file for complete search history.

(56) References Cited

U.S. PATENT DOCUMENTS

| | | | |
|---|---|---|---|
| 6,192,393 B1 | 2/2001 | Tarantino et al. | |
| 2002/0021353 A1* | 2/2002 | DeNies | 348/36 |
| 2002/0180725 A1 | 12/2002 | Simmonds et al. | |
| 2002/0191867 A1* | 12/2002 | Le et al. | 382/300 |
| 2004/0135784 A1 | 7/2004 | Cohen et al. | |
| 2005/0243097 A1 | 11/2005 | Cohen et al. | |
| 2006/0012707 A1* | 1/2006 | Chow | 348/441 |
| 2006/0132482 A1* | 6/2006 | Oh | 345/419 |
| 2007/0013708 A1 | 1/2007 | Barcklay et al. | |
| 2007/0030341 A1 | 2/2007 | Morimoto | |
| 2009/0289954 A1* | 11/2009 | Naito et al. | 345/629 |

FOREIGN PATENT DOCUMENTS

| | | |
|---|---|---|
| EP | 1 244 091 A2 | 9/2002 |
| JP | 2-310592 | 12/1990 |
| JP | 2004-198639 | 7/2004 |

(Continued)

OTHER PUBLICATIONS

Partial European Search Report issued Jun. 24, 2011, in Patent Application No. 08167225.5.
European Search Report issued Oct. 24, 2011, in Patent Application No. 08167225.5.
Japanese Office Action issued Nov. 8, 2011, in Patent Application No. 2007-289218.

*Primary Examiner* — Xiao M. Wu
*Assistant Examiner* — Todd Buttram
(74) *Attorney, Agent, or Firm* — Oblon, Spivak, McClelland, Maier & Neustadt, L.L.P.

(57) ABSTRACT

An image processing apparatus that displays, on a display region having a first number of pixels, an image represented by gigantic image data that is recorded in a recording medium and has a second number of pixels that is significantly greater than the first number of pixels, including: a reproducing unit configured to read image data from the recording medium; an output unit configured to output the image data, which is read by the reproducing unit from the recording medium, in synchronization with a vertical synchronization signal; and a control unit configured to control the reproducing unit and the output unit. The control unit performs control to extract and read a region corresponding to the display region from the gigantic image data recorded in the recording medium.

12 Claims, 19 Drawing Sheets

FOREIGN PATENT DOCUMENTS

| | | |
|---|---|---|
| JP | 2005-38179 | 2/2005 |
| JP | 2006-174123 | 6/2006 |
| JP | 2007-43505 | 2/2007 |
| WO | WO 02/15162 A2 | 2/2002 |

* cited by examiner

BOTTOM
TOP
BACKGROUND LAYER — 40
PRIMARY VIDEO LAYER — 41
SECONDARY VIDEO LAYER — 42
SUBTITLES GRAPHICS LAYER — 43
INTERACTIVITY GRAPHICS LAYER — 44

| OFFSET | CONTENT | SIZE |
|---|---|---|
| 00h | DATA SIZE | 4 bytes |
| 04h | CHUNK NAME | 4 bytes |
| 08h | DATA SEQUENCE | VARIABLE LENGTH |
| 08h+DATA SIZE | CRC CHECK VALUE | 4 bytes |

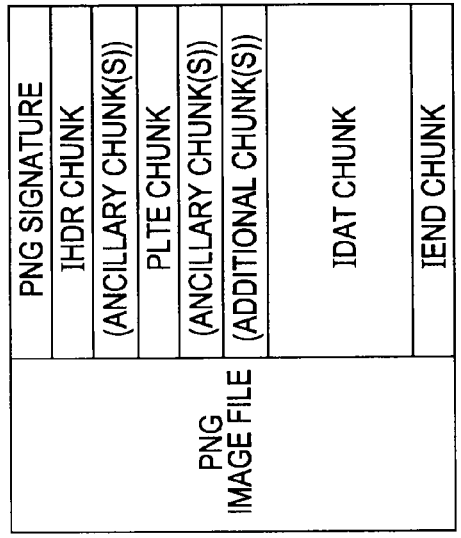

| DATA STRUCTURE | STRUCTURE OF WHOLE FILE | |
|---|---|---|
| | ROLE | DESCRIPTION |
| PNG SIGNATURE | IDENTIFIER OF PNG | 8-BYTE SEQUENCE FOR IDENTIFYING PNG IMAGE |
| IHDR CHUNK | IMAGE HEADER | IMPORTANT DATA OF WHOLE IMAGE, SUCH AS IMAGE SIZE AND BIT DEPTH |
| ANCILLARY CHUNK(S) | — | CHUNK(S) RELATING TO DISPLAYING COLORS, SUCH AS GAMMA VALUE AND CHROMA |
| PLTE CHUNK | PALETTE | CRITICAL IN INDEX COLOR MODE |
| ANCILLARY CHUNK(S) | — | CHUNK(S) RELATING TO DISPLAYING TRANSPARENT COLORS |
| ADDITIONAL CHUNK(S) | — | PUBLIC CHUNK(S); NOT NECESSARY TO BE WRITTEN |
| IDAT CHUNK | IMAGE DATA | SEQUENCE OF COMPRESSED IMAGE DATA; MULTIPLE IDAT CHUNKS MAY EXIST |
| IEND CHUNK | END OF IMAGE | END OF PNG FILE; 0 DATA LENGTH |

FIG. 14

| Address | No. bytes | Bytes | Description | Format |
|---|---|---|---|---|
| 00h | 8 | | Header | See Section 3.3 |
| 00h | | 1 | 00h | |
| 01h | | 1 | FFh | |
| 02h | | 1 | FFh | |
| 03h | | 1 | FFh | |
| 04h | | 1 | FFh | |
| 05h | | 1 | FFh | |
| 06h | | 1 | FFh | |
| 07h | | 1 | 00h | |
| 08h | 10 | Bytes | Vender/Product Identification | See Section 3.4 |
| 08h | | 2 | ID Manufacture Name | EISA 3-character ID |
| 0Ah | | 2 | ID Product Code | Vender assigned code |
| 0Ch | | 4 | ID Serial Number | 32-bit serial number |
| 10h | | 1 | Week of Manufacture | Week number |
| 11h | | 1 | Year of Manufacture | Year |
| 12h | 2 | Bytes | EDID Structure Version/Revision | See Section 3.5 |
| 12h | | 1 | Version# | Binary |
| 13h | | 1 | Revision# | Binary |
| 14h | 5 | Bytes | Basic Display Parameters/Features | See Section 3.6 |
| 14h | | 1 | Video Input Definition | |
| 15h | | 1 | Max. Horizontal Image Size | cm |
| 16h | | 1 | Max. Vertical Image Size | cm |
| 17h | | 1 | Display Transfer Characteristic | Binary |
| 18h | | 1 | Feature Support | See Table 3.11 |
| 19h | 10 | Bytes | Color Characteristics | See Section 3.7 |
| 19h | | 1 | Red/Green Low Bits | Rx1 Rx0 Ry1 Ry0 Gx1 Gx0 Gy1 Gy0 |
| 1Ah | | 1 | Blue/White Low Bits | Bx1 Bx0 By1 By0 Wx1 Wx0 Wy1 Wy0 |

FIG. 15

| | | | |
|---|---|---|---|
| 1Bh | | Red-x | Red-x Bits 9-2 |
| 1Ch | | Red-y | Red-y Bits 9-2 |
| 1Dh | | Green-x | Green-x Bits 9-2 |
| 1Eh | | Green-y | Green-y Bits 9-2 |
| 1Fh | | Blue-x | Blue-x Bits 9-2 |
| 20h | | Blue-y | Blue-y Bits 9-2 |
| 21h | | White-x | White-x Bits 9-2 |
| 22h | | White-y | White-y Bits 9-2 |
| 23h | 3 Bytes | Established Timings | See Section 3.8 |
| 23h | 1 | Established Timings 1 | |
| 24h | 1 | Established Timings 2 | |
| 25h | 1 | Manufacture's Reserved Timings | |
| 26h | 16 Bytes | Standard Timing Identification | See Section 3.9 |
| 27h | 2 | Standard Timing Identification #1 | |
| 28h | 2 | Standard Timing Identification #2 | |
| 2Ah | 2 | Standard Timing Identification #3 | |
| 2Ch | 2 | Standard Timing Identification #4 | |
| 2Eh | 2 | Standard Timing Identification #5 | |
| 30h | 2 | Standard Timing Identification #6 | |
| 32h | 2 | Standard Timing Identification #7 | |
| 34h | 2 | Standard Timing Identification #8 | |

FIG. 16

| | Bytes | Detailed Timing Descriptions | See Section 3.10 |
|---|---|---|---|
| 36h | 8 | | |
| 36h | 1 | Detailed Timing Descriptions #1 | EDID structure Version 1, Revisions 1 and 2, allowed this space to be used for Monitor Descriptors. Host SW using this data should be prepared to detect. Monitor Descriptors also in this location even though displays conforming to later revisions of EDID structure only use this space for Detailed Timing Description. |
| 48h | 1 | Detailed Timing Description #2 or Monitor Descriptor | |
| 08h | 2 | Detailed Timing Description #3 or Monitor Descriptor | |
| 0Ch | 4 | Detailed Timing Description #4 or Monitor Descriptor | |
| 11h | Bytes | Extension Flag | Number of (optional) 128-byte EDID extension blocks to follow. |
| 12h | Bytes | Checksum | The 1-byte sun of all 128 byte in this EDID block shall equal zero. |

FIG. 17

Monitor
  Windows description......... XXXX SDM-P234 DVI-D
  Manufacturer description.... ZZZ -P234
  Manufacturer............... XXXX
  Plug and Play ID............ ABC0123
  Serial number............... 9999998
  EDID data source............ I2C bus (real-time)
  Manufacture data........... 2005, ISO week 44
  EDID revision.............. 1.3
  Display type and signal..... Digital
  Sync input support......... n/a
  Screen size................ 500 × 310 mm (to 25")
  Power management........... Standby, Suspend, Active off/sleep Color characteristics
  Display gamma............... 2.20
  Red chromaticity........... Rx 0.640 – Ry 0.343
  Green chromaticity......... Gx 0.292 – Gy 0.618
  Blue chromaticity.......... Bx 0.146 – By 0.074
  White point (default)...... Wx 0.313 – Wy 0.329

Timing characteristics
  VESA GTF support........... Not supported
  Horizontal scan range...... 28 – 75 kHz
  Vertical scan range........ 57 – 63 Hz
  Video bandwidth............ 160 MHz
  Extension blocks........... n/a
  Timing recommendation #1.... 1920 × 1200 at 60 Hz
    Modeline..............."1920 × 1200" 154.000 1920 1968 2000 2080 1200 1203 1209 1235 + hsync – vsync
  Timing recommendation #2.... 1600 × 1200 at 60 Hz
    Modeline..............."1600 × 1200" 162.000 1600 1664 1856 2160 1200 1201 1204 1250 + hsync + vsync Standard timings supported
  640 × 480 at 60 Hz – IBM VGA
  720 × 400 at 70 Hz – IBM VGA
  800 × 600 at 60 Hz – VESA
  1024 × 768 at 60 Hz – VESA
  1280 × 960 at 60 Hz – VESA
  1280 × 1024 at 60 Hz – VESA
  1600 × 1200 at 60 Hz – Sony
  1600 × 1200 at 60 Hz – VESA
  1920 × 1200 at 60 Hz – Sony

IMAGE PROCESSING APPARATUS, IMAGE PROCESSING METHOD, AND IMAGE PROCESSING PROGRAM

CROSS REFERENCES TO RELATED APPLICATIONS

The present invention contains subject matter related to Japanese Patent Application JP 2007-289218 filed in the Japanese Patent Office on Nov. 7, 2007, the entire contents of which are incorporated herein by reference.

BACKGROUND OF THE INVENTION

1. Field of the Invention

The present invention relates to an image processing apparatus, an image processing method, and an image processing program which are suitable for use in displaying an image represented by image data having a significantly large number of pixels on a display device having a standard number of pixels.

2. Description of the Related Art

In recent years, as digital transmission technology and video data compression and encoding technology have advanced, the resolution of television images has increased. For example, a resolution of 1920 pixels×1080 lines in interlace scanning (1080I) has been realized for so-called high-definition video in current terrestrial digital broadcasting. In progressive scanning, a resolution of 1920 pixels×1080 lines (1080P) has been realized as a standard. Further, many monitor devices that are used for displaying such television images and have effective display pixels whose number corresponds to the resolution of high-definition video have been developed. An interface standard for transmitting television signals based on high-definition video has been defined as the High-Definition Multimedia Interface (HDMI).

In contrast, the technique of obtaining an image covering a wide range that is significantly wider than the angle of view of an image capturing apparatus (hereinafter called a "panoramic image") by sequentially capturing images while continuously moving an image capturing range so that the captured images become continuous and connecting the captured images in a predetermined manner has been developed. Japanese Unexamined Patent Application Publication No. 2007-43505 describes a method of controlling a camera at the time of capturing a panoramic image and a method of generating a panoramic image from image data captured under such control.

A panoramic image having a significantly greater number of pixels than that of image data obtained in one shot using a general image capturing method. In other words, when a panoramic image is regarded as image data representing one image, the panoramic image has a significantly higher resolution than that of image data obtained in one shot taken by using a general image capturing method.

For example, in recent years, image pickup devices such as charge-coupled device (CCD) and complementary metal-oxide semiconductor (CMOS) imagers have become more sophisticated. Even with the use of generally used digital still cameras that are designed to be compact and light-weight (so-called "compact cameras"), an image with a resolution of, for example, 4000 pixels×3000 pixels or 3264 pixels×2448 pixels, which is higher than that of high-definition video, can be easily captured. Digital single-lens reflex cameras can capture image data with a yet higher resolution. A panoramic image is generated by connecting items of such image data, each having a number of pixels of, for example, 4000 pixels× 3000 pixels or 3264 pixels×2448 pixels. Therefore, the total number of pixels of the panoramic image is significantly greater than the number of pixels of the above-described high-definition video, for example, and is a vast number of pixels.

SUMMARY OF THE INVENTION

There has been a demand for the technique of displaying an image, as in a panoramic image, represented by image data having a number of pixels exceeding the number of effective display pixels of a monitor device while making the most use of such a high resolution.

Here, the case in which an image, as in a panoramic image, represented by image data having a number of pixels exceeding the number of effective display pixels of a monitor device is to be displayed on the monitor device will be considered. In this case, for example, the number of pixels of the image data may be reduced in accordance with the number of effective pixels of the monitor device. However, reduction of the number of pixels of the image data involves pixel decimation and filtering of the image data, and accordingly, degradation of the resolution is unavoidable.

In particular, in the case of image data, as in the above-described panoramic image, which is generated by connecting items of image data and has a vast number of pixels, the reduction ratio of the image becomes significantly great. Therefore, most of the detailed information of the image is lost, and it is thus difficult to make the most use of the resolution of the image data.

Alternatively, a region with a number of pixels corresponding to the number of effective display pixels of the monitor device may be extracted from the image data having a vast number of pixels, and an image may be represented by that region of the image data. In this case, however, a memory with a vast capacity corresponding to the number of pixels of the whole image data becomes necessary in order to develop the image data, resulting in an increase in the cost of the device. Even if a memory with a sufficient capacity can be mounted, the size of image data that can be handled is limited to the mounted memory.

It is desirable to provide an image processing apparatus, an image processing method, and an image processing program for displaying an image represented by image data having a number of pixels that is significantly greater than the number of effective pixels of a display device while making the most use of the resolution of the image data.

According to an embodiment of the present invention, there is provided an image processing apparatus that displays, on a display region having a first number of pixels, an image represented by gigantic image data that is recorded in a recording medium and has a second number of pixels that is significantly greater than the first number of pixels, including the following elements: a reproducing unit configured to read image data from the recording medium; an output unit configured to output the image data, which is read by the reproducing unit from the recording medium, in synchronization with a vertical synchronization signal; and a control unit configured to control the reproducing unit and the output unit. The control unit performs control to extract and read a region corresponding to the display region from the gigantic image data recorded in the recording medium.

According to another embodiment of the present invention, there is provided an image processing method including: extracting and reading a region corresponding to a display region having a first number of pixels from gigantic image data having a second number of pixels that is significantly greater than the first number of pixels; and outputting image data included in the read region in synchronization with a vertical synchronization signal.

According to another embodiment of the present invention, there is provided an image processing program for causing an apparatus to execute an image processing method including: extracting and reading a region corresponding to a display region having a first number of pixels from gigantic image data having a second number of pixels that is significantly greater than the first number of pixels; and outputting image data included in the read region in synchronization with a vertical synchronization signal.

As described above, according to the embodiments of the present invention, a region corresponding to a display region having a first number of pixels is extracted and read from gigantic image data that is recorded in a recording medium and has a second number of pixels that is significantly greater than the first number of pixels. Image data included in the read region is output in synchronization with a vertical synchronization signal. Accordingly, an image represented by the gigantic image data can be displayed on the display region without involving a reduction of the resolution, and the number of pixels of gigantic image data that can be processed is not limited to the capacity of a memory.

BRIEF DESCRIPTION OF THE DRAWINGS

FIGS. 11A and 11B are schematics diagrams showing the structure of an exemplary PNG image file;

FIG. 14 is a schematic diagram showing a data format defined in extended display identification data (EDID);

FIG. 15 is a schematic diagram showing the data format defined in EDID;

FIG. 16 is a schematic diagram showing the data format defined in EDID;

FIG. 17 is a schematic diagram showing an example in which EDID is read by using software;

DESCRIPTION OF THE PREFERRED EMBODIMENTS

Hereinafter, a first embodiment of the present invention will be described. In embodiments of the present invention, when displaying an image represented by image data that is recorded in a recording medium and has a number of pixels significantly greater than the number of pixels of a display region of a monitor device (hereinafter called "gigantic image data") on the display region, a block corresponding to the display region is extracted from the gigantic image data and is used for display. On this occasion, a predetermined amount of the gigantic image data, which is less than or equal to the capacity of a memory that can be used for developing the image data for display, is read from the recording medium. When a portion of the gigantic image data to be displayed on the display region is arranged to move, the next portion of the gigantic image data is read in advance from the recording medium and stored in the memory before the next item of data becomes necessary.

Accordingly, the number of pixels of gigantic image data that can be processed is not limited to the capacity of the memory. In addition, the case in which a display region moves within the gigantic image data can be handled.

Further, according to the first embodiment, an image is moved in increments of a pixel in synchronization with a vertical synchronization signal of an output video signal. Accordingly, blur or flicker of the image due to the movement of the image can be eliminated or reduced.

Figure 1:
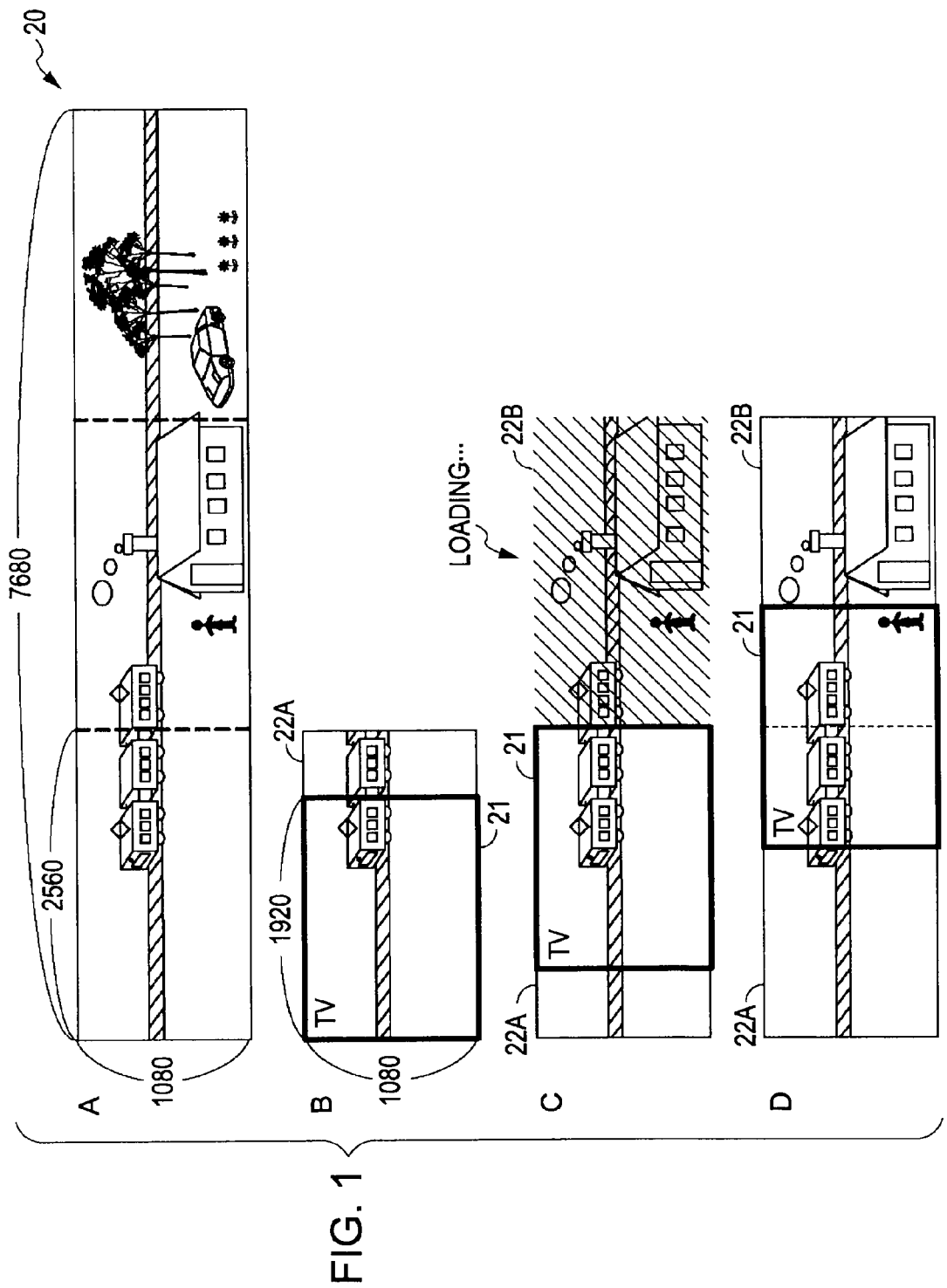
FIG. 1 is a schematic diagram showing the outline of image display according to a first embodiment of the present invention.
Figure 2:
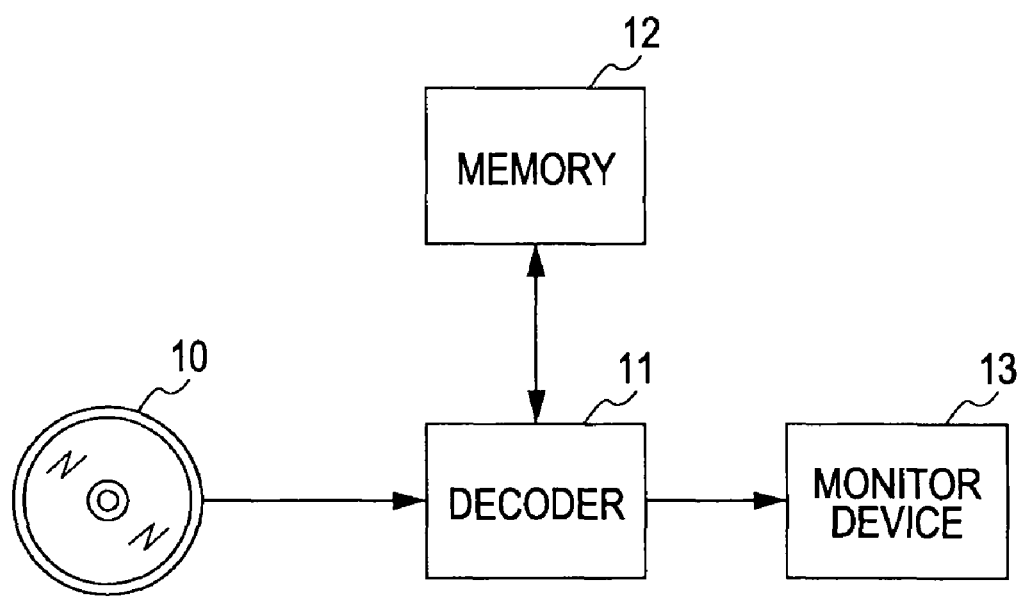
FIG. 2 is a block diagram showing the outline of a system applicable to the first embodiment.

Referring to FIGS. 1 and 2, the first embodiment will be more specifically described. FIG. 1 schematically shows image display according to the first embodiment of the present invention. FIG. 2 schematically shows a system applicable to the first embodiment. In this system, compressed and encoded gigantic image data recorded in a recording medium 10 is read in a predetermined manner, and the read gigantic image data is decoded by a decoder 11 and output to a monitor device 13 so that an image represented by the gigantic image data is displayed. The decoder 11 performs decoding of the compressed image data using a memory 12.

For example, the case in which, as shown in part A of FIG. 1, an image represented by gigantic image data 20 having 7680 pixels in the horizontal direction and 1080 pixels in the vertical direction is to be displayed on a monitor device having an effective pixel region having 1920 pixels in the horizontal direction and 1080 pixels in the vertical direction will be considered. In this case, image data is extracted from the gigantic image data 20 in increments of a block having a size corresponding to the effective display region of the monitor device, and an image represented by the extracted image data is to be displayed on the monitor device.

The gigantic image data 20, which has been subjected to compression and encoding in a predetermined format, is provided by being recorded in the recording medium 10. At the time of displaying an image represented by the gigantic image data 20, the gigantic image data 20 is read from the recording medium 10, and the compressed and encoded gigantic image data 20 is decoded by the decoder 11 and supplied to the monitor device 13. Note that there is a maximum size of image data that can be decoded by the decoder 11. It is assumed that the decoder 11 can decode image data up to a size of 2560 pixels×1080 pixels, for example. Further, it is assumed that the memory 12 used when the decoder 11 performs decoding of compressed image data at least has a capacity twice as large as the size of image data that can be decoded by the decoder 11.

The case in which a portion of the image represented by the gigantic image data 20 displayed on a display region of the monitor device 13 (hereinafter called a "display data block 21") is sequentially moved from the left end to the right end of the gigantic image data 20 will be considered. First, access is gained to, of the gigantic image data 20 recorded in the recording medium 10, data that includes the display data block 21 and has a decodable size, and data in that data region is read. The read data is supplied to the decoder 11, and the compressed and encoded data is decoded by the decoder 11 and developed in the memory 12 (part B of FIG. 1). In the example shown in part B of FIG. 1, image data with a size of 2560 pixels×1080 pixels is decoded by the decoder 11 and developed in the memory 12 (which is indicated as decoded data 22A in FIG. 1).

Firstly, from the decoded data 22A developed in the memory 12, data equivalent to 1920 pixels in the horizontal direction and 1080 pixels in the vertical direction, which corresponds to the display region of the monitor device 13, is read as data included in the display data block 21, starting with a position corresponding to the left end of the image, for example. The read data is supplied to the monitor device 13 via a video memory, which is not shown in the drawings, for example. When the display data block 21 is moved from the left end to the right end of the gigantic image data 20, the image displayed on the display region of the monitor device 13 is moved in accordance with the movement of the display data block 21.

When the display data block 21 approaches the end of the decoded data 22A developed in the memory 12, access is gained to the next data region of the gigantic image data 20 recorded in the recording medium 10, and data in that data region is read (part C of FIG. 1). The read data is supplied to the decoder 11, and the compressed and encoded data is decoded by the decoder 11 and developed in the memory 12 (which is indicated as decoded data 22B in FIG. 1). On this occasion, the newly developed decoded data 22B is mapped onto the memory 12 so that access can be gained to the decoded data 22B following the decoded data 22A which has been developed previously.

The display data block 21 is further moved toward the right end of the gigantic image data 20, and, when the display data block 21 reaches a position including the boundary between the decoded data 22A and the decoded data 22B developed in the memory 12, the display data block 21 is moved in each of the decoded data 22A and the decoded data 22B, as illustrated in part D of FIG. 1.

Figure 3:
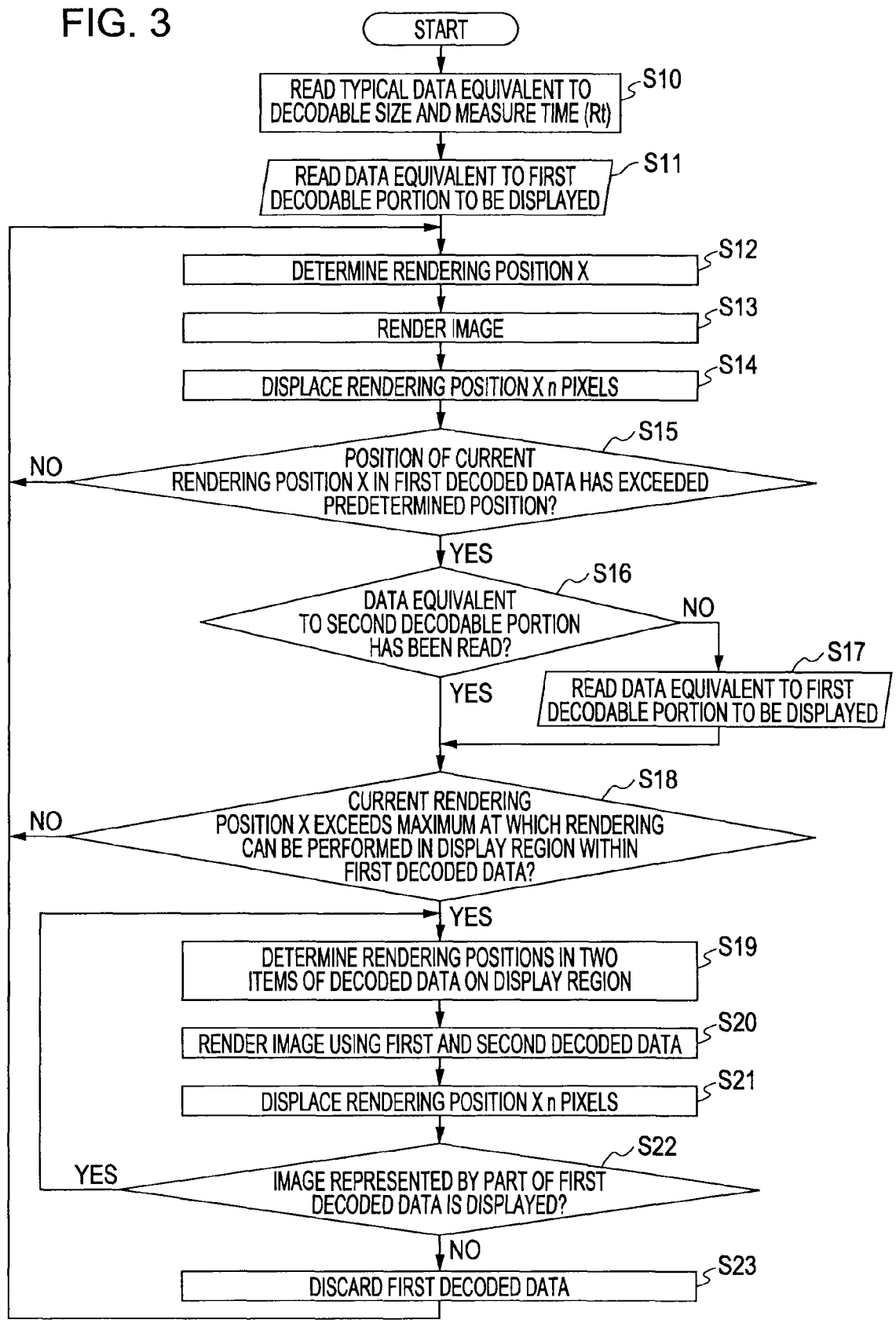
FIG. 3 is a flowchart showing an exemplary image displaying process according to the first embodiment.

FIG. 3 is a flowchart showing an exemplary image displaying process according to the first embodiment. The process shown in the flowchart is an exemplary process at the time of moving the display data block 21 in the gigantic image data 20 and scrolling display on the display region of the monitor device 13.

In step S10, data equivalent to a decodable size is read in a predetermined manner from the gigantic image data 20 recorded in the recording medium 10, and a time Rt involved in the reading is measured. For example, it is conceivable to read data equivalent to the decodable size from a typical position (for example, a central portion of the image) of the gigantic image data 20. The time Rt includes the time involved in reading data equivalent to the decodable size and decoding the read data.

When the time Rt is measured, in step S11, data equivalent to a first decodable portion is read for display from the gigantic image data 20 recorded in the recording medium 10. For example, data that is designated to be displayed first, includes the display data block 21, and is equivalent to the decodable size is read. This data equivalent to the first decodable portion, which has been read from the recording medium 10, is decoded by the decoder 11 and developed as, for example, the decoded data 22A in the memory 12.

In step S12, a rendering position X of the image data to be displayed on the monitor device 13 in the decoded data 22A is determined. That is, the address of the display data block 21 in the decoded data 22A is determined in step S12. When the rendering position X is determined, in step S13, an image is rendered on the basis of the rendering position X. The rendering of the image is performed in synchronization with a vertical synchronization signal of a video signal output to the monitor device 13. By performing the rendering in synchronization with the vertical synchronization signal, blur or flicker of the image due to the movement of the display region can be eliminated or reduced.

For example, the range of the display data block 21 is determined on the basis of the rendering position X, and image data within the range of the display data block 21 is read from the memory 12 and written into a video memory, which is not shown in the drawings. The data written into the video memory is supplied to the monitor device 13 in synchronization with the vertical synchronization signal, and an image represented by the data is displayed on the screen.

When the rendering based on the display data block 21 in step S13 is completed, in step S14, the rendering position X is displaced n pixels in a predetermined designated moving direction. In step S15, it is determined whether the position of the current rendering position X in the decoded data 22A which is the first encoded data has exceeded a predetermined position. That is, in step S15, the timing for preparing the next decoded data 22B in the case where the display data block 21 is moved within the decoded data 22A is determined.

Figure 4:
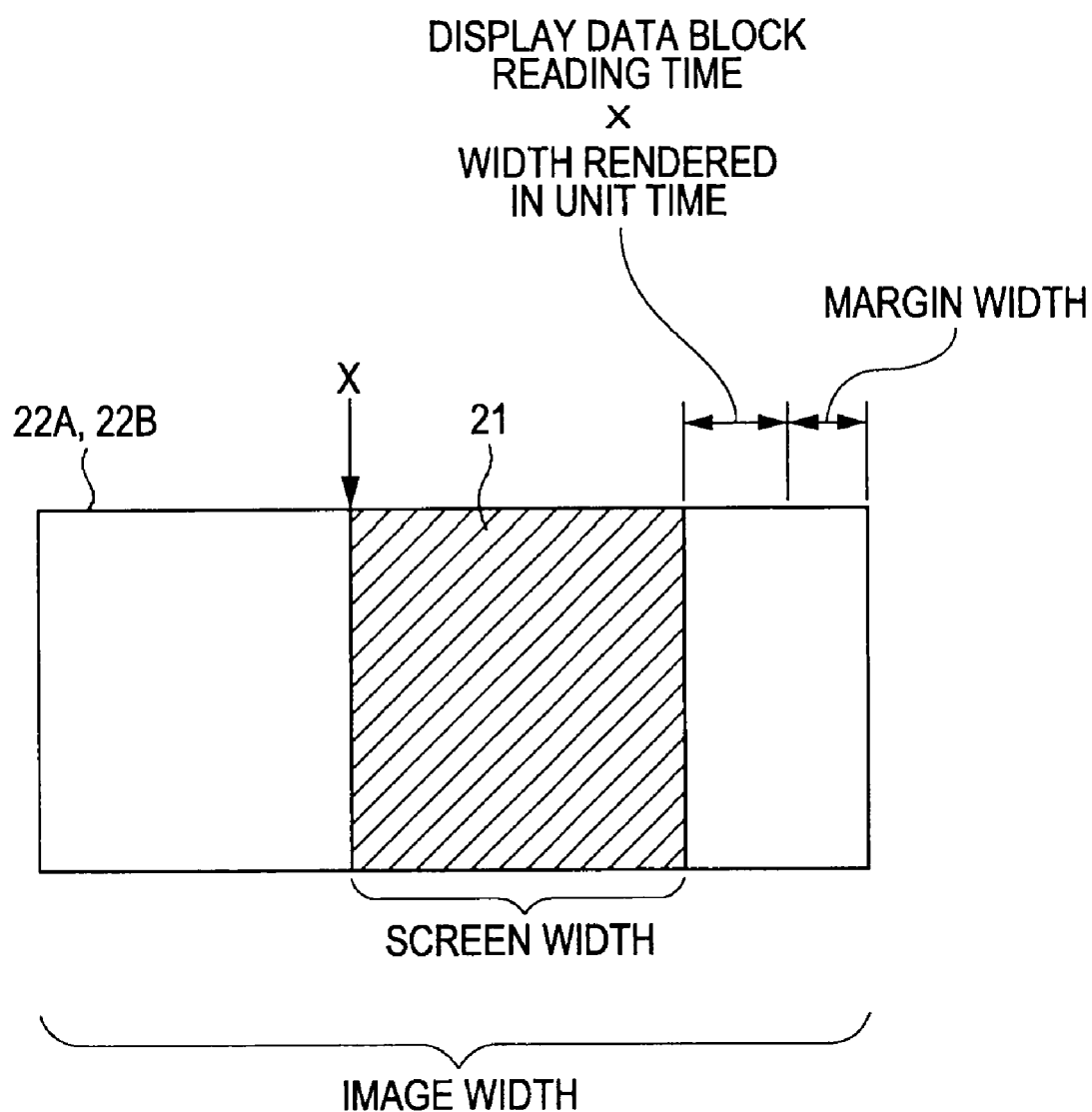
FIG. 4 is a schematic diagram for describing a process of determining whether the position of a current rending position X in first decoded data exceeds a predetermined position.

Using FIG. 4, the processing in step S15 will be described more specifically. Referring to FIG. 4, it is assumed that the number of pixels in the horizontal direction of the decoded data 22A (or decoded data 22B) developed in the memory 12 serves as an image width, and the number of pixels in the horizontal direction of the display data block 21 serves as a screen width. In this case, in step S15, the following equation is calculated, and a calculation result $X_{max}$ is compared with the rendering position X:

$$X_{max} = (\text{image width} - \text{screen width}) - (\text{reading time } Rt \times \text{width rendered in unit time}) - \text{margin width} \quad (1)$$

In equation (1), (reading time Rt×width rendered in unit time) indicates the distance moved by the display data block 21 during a period in which data equivalent to the decodable size is read from the recording medium 10 in the case where the display data block 21 is moved at a certain speed. The margin width can be arbitrarily set in accordance with the convenience of the system or the like. That is, when the current rendering position X is positioned ahead of the position indicated by the calculation result $X_{max}$ in the moving direction, it can be determined that the next decoded data 22B may not be able to be prepared in the memory 12 by the time at which the display data block 21 moves to the end of the decoded data 22A developed in the memory 12.

When it is determined, as a result of the comparison in step S15 between the above-described calculation result $X_{max}$ and the rendering position X, that the rendering position X is less than the calculation result $X_{max}$, the process returns to step S12 in which the rendering position X is displaced n pixels and rendering is performed. In contrast, when it is determined on the basis of the comparison result that the rendering position X is greater than or equal to the calculation result $X_{max}$, the process proceeds to step S16.

In step S16, it is determined whether data equivalent to a second decodable portion, which is to be used for display after the data equivalent to the first decodable portion read in step S11, has been read from the recording medium 10. The data equivalent to the second decodable portion is, in the gigantic image data 20, for example, data whose image region is adjacent, in the moving direction of the display data block 21, to the data equivalent to the first decodable portion. When it is determined that the data equivalent to the second decodable portion has been read from the recording medium 10, the process proceeds to step S18.

In contrast, when it is determined that no data equivalent to the second decodable portion has been read, the process proceeds to step S17, and the data equivalent to the second decodable portion is read from the recording medium 10. The process proceeds to step S18. The reading of the data equivalent to the second decodable portion is performed in parallel to other processing using, for example, a different thread.

In step S18, it is determined whether the current rendering position X exceeds the maximum at which the rendering can be performed on the display region within the decoded data 22A which is the first decoded data. That is, referring to FIG. 4, it is determined in step S18 whether the current rendering position X is greater than the value of (image width−screen width). When it is determined that the current rendering position X is less than or equal to the maximum, the process returns to step S12 in which the rendering position X is displaced n pixels and rendering is performed.

In contrast, when it is determined in step S18 that the current rendering position X is greater than the maximum, the process proceeds to step S19. In step S19, rendering positions for rendering, on the display region, images represented by the decoded data 22A and the decoded data 22B are determined. In step S20, rendering is performed using the first decoded data 22A and the second decoded data 22B. That is, when the display data block 21 is covering the decoded data 22A and the decoded data 22B, portions of the decoded data 22A and the decoded data 22B covered by the display data block 21 are read as items of rendering data from the memory 12. As in step S13 described above, the rendering of an image is performed in synchronization with the vertical synchronization signal of the video signal output to the monitor device 13.

When the rendering based on the display data block 21 is completed, in step S21, the rendering position X is displaced n pixels in the predetermined designated moving direction.

In step S22, it is determined whether an image represented by image data which is part of the decoded data 22A is displayed. That is, if the whole display data block 21 is moved to the decoded data 22B side, no image represented by image data which is part of the decoded data 22A will be displayed. Note that, when it is determined that an image represented by image data which is part of the decoded data 22A is still being displayed, the process returns to step S19 in which the rendering position X is displaced n pixels and rendering is performed.

In contrast, when it is determined in step S22 that no image represented by image data which is part of the decoded data 22A is displayed, the process proceeds to step S23, and the decoded data 22A is discarded. Then, the process returns to step S12. That is, when the display data block 21 is continuously moved after the decoded data 22A has been discarded, new data equivalent to the decodable size is read from the recording medium 10 and decoded by the decoder 11. The new decoded data obtained by the decoding is written into the address in the memory 12 where the discarded decoded data 22A was written.

When the memory 12 is configured as a ring memory and regions where the decoded data 22A and the decoded data 22B are written are recursively used, continuous movement of the display data block 21 can be more smoothly performed.

Various methods of accessing data in a desired region of one file storing gigantic image data are conceivable. For example, when gigantic image data has been compressed and encoded by block coding such as the Joint Photographic Experts Group (JPEG) scheme, access in increments of a discrete cosine transform (DCT) block enables extraction of a desired region of the gigantic image data, such as data equivalent to the above-described decodable size. For example, markers described in a JPEG file are retrieved, and, on the basis of the marker information, DCT blocks included in the file are extracted, thereby mapping the positions of the DCT blocks in an image rendered with the JPEG file.

A compression and encoding scheme applicable to the first embodiment is not limited to the JPEG scheme. That is, other schemes are applicable as long as they can specify, from compressed and encoded image data, the positions of decoded pixels and decoded blocks. For example, it is conceivable to apply the Graphics Interchange Format (GIF) scheme and the PNG scheme to the first embodiment. An exemplary application of the PNG format will be described later.

Next, a second embodiment of the present invention will be described. The second embodiment is an example in which the above-described first embodiment is applied to an application based on the BD-ROM standard. The BD-ROM standard will be briefly described.

The Blu-ray Disc standard employs a disc with a diameter of 12 cm and a cover layer thickness of 0.1 mm as a recording medium, a blue-violet laser with a wavelength of 405 nm as an optical system, and an object lens with a numerical aperture of 0.85 to realize a recording capacity of 27 GB at maximum. Therefore, a Blu-ray disc can record at least two hours of a Japanese broadcasting satellite (BS) digital high-definition television broadcast without degradation of the image quality. The BD-ROM standard is a standard for the read-only type Blu-ray disc and defined in "Blu-ray Disc Read-Only Format Ver. 1.0 part 3 Audio Visual Specifications".

The BD-ROM standard handles a BD-J object including a movie object including video and audio and an object including a Java program.

Figure 5:
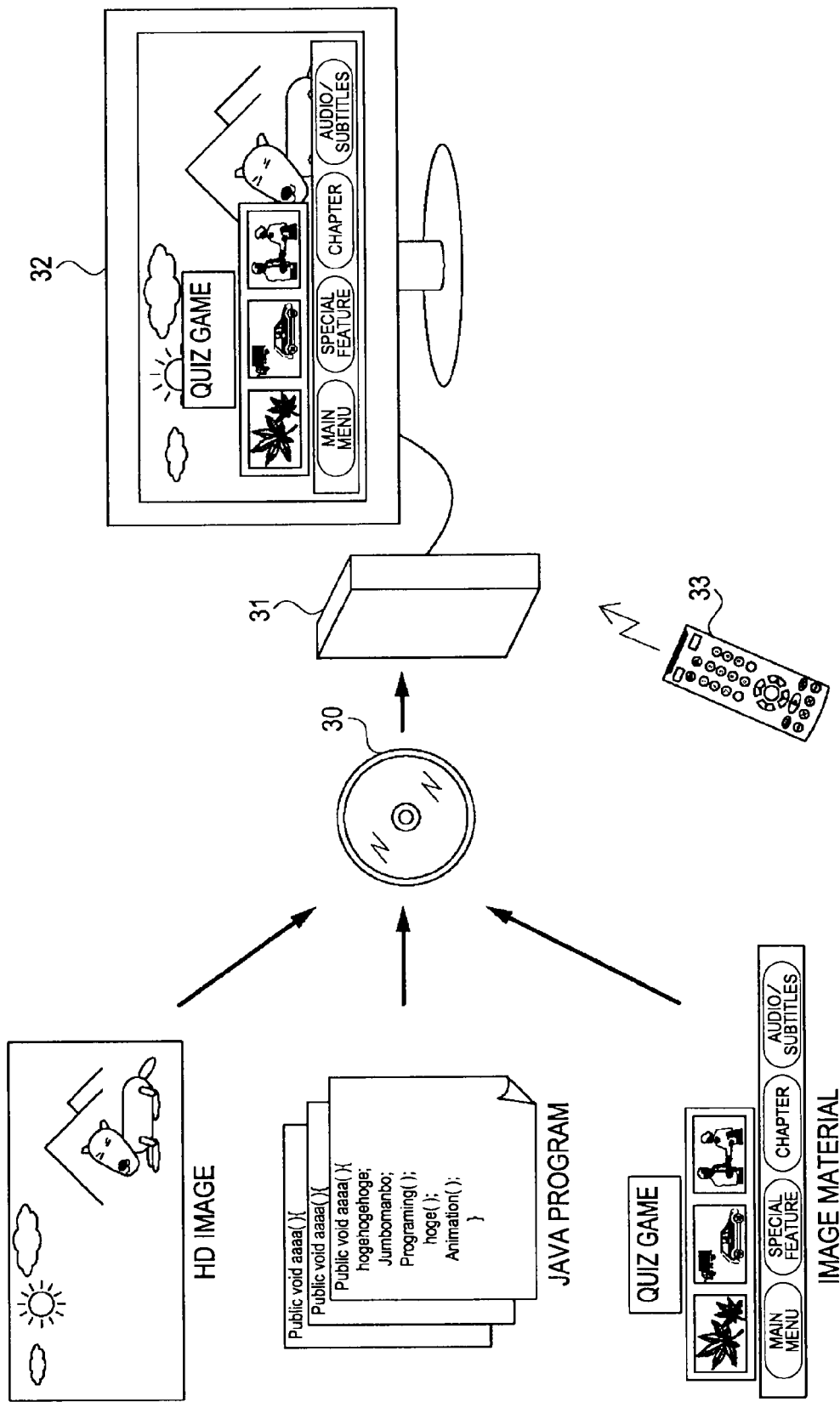
FIG. 5 is a schematic diagram showing the outline of applications of a second embodiment.

That is, as schematically shown in FIG. 5, a video stream and playback control information for reproducing high-definition video, a Java program for executing a BD-J object, navigation for playing the high-definition video, and image materials used by the BD-J object are stored in a disc 30 which is a BD-ROM. By playing the disc 30 on a BD player 31 supporting the BD-ROM standard, the high-definition video and image materials recorded in the disc 30 can be output to a monitor device 32 connected to the BD player 31 and images represented by the high-definition video and image materials can be displayed on the monitor device 32 in accordance with the playback control information and Java program recorded in the disc 30.

By giving instructions to the BD player 31 using a predetermined operation unit, such as a remote control commander 33 which can communicate from a remote place with the BD player 31, an operation in accordance with the playback control information and the Java program can be performed on the BD player 31. Therefore, playback control operations such as title selection, chapter jump, search, and pause of the high-definition video and other interactive operations can be realized.

Figure 6:
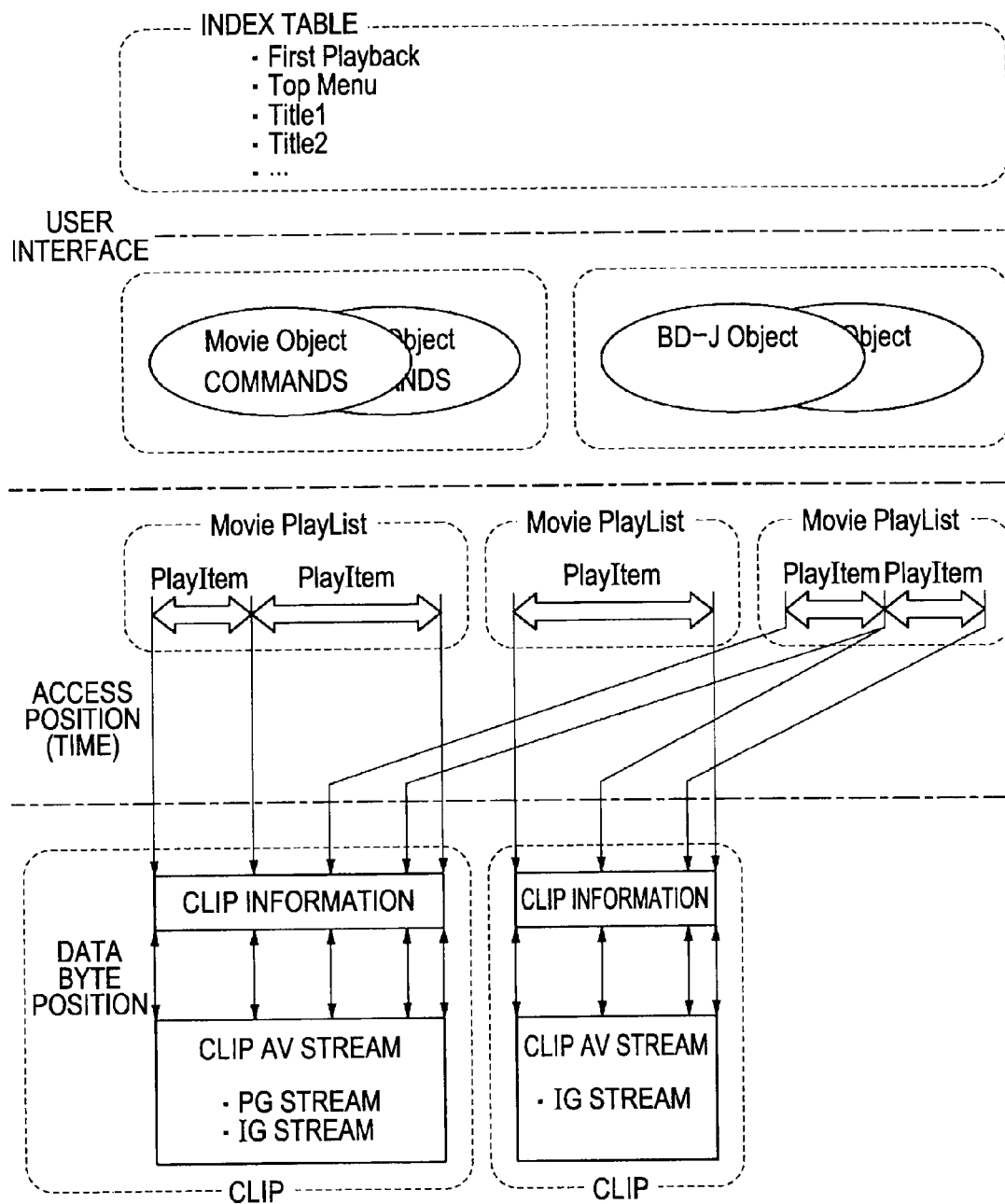
FIG. 6 is a schematic diagram showing the outline of a data model of a Blu-ray Disc (registered trademark of Blu-ray Disc Association) read-only memory (BD-ROM)

FIG. 6 schematically shows a data model of a BD-ROM. The data structure of a BD-ROM having four layers, as shown in FIG. 6. The bottom layer is a layer in which clip audiovisual (AV) streams are located (called "clip layer" for convenience). The second layer from the bottom is a layer in which movie playlists each designating a playback position on the corresponding clip AV stream and play items are located (called "playlist layer" for convenience). The third layer from the bottom is a layer in which movie objects each including a command that designates the order of playing items in the corresponding movie playlist and BD-J objects which enables interactive and free operations are located (called "object layer" for convenience). The top layer is a layer in which an index table for managing titles stored in the BD-ROM is located (called "index layer" for convenience).

Figure 7:
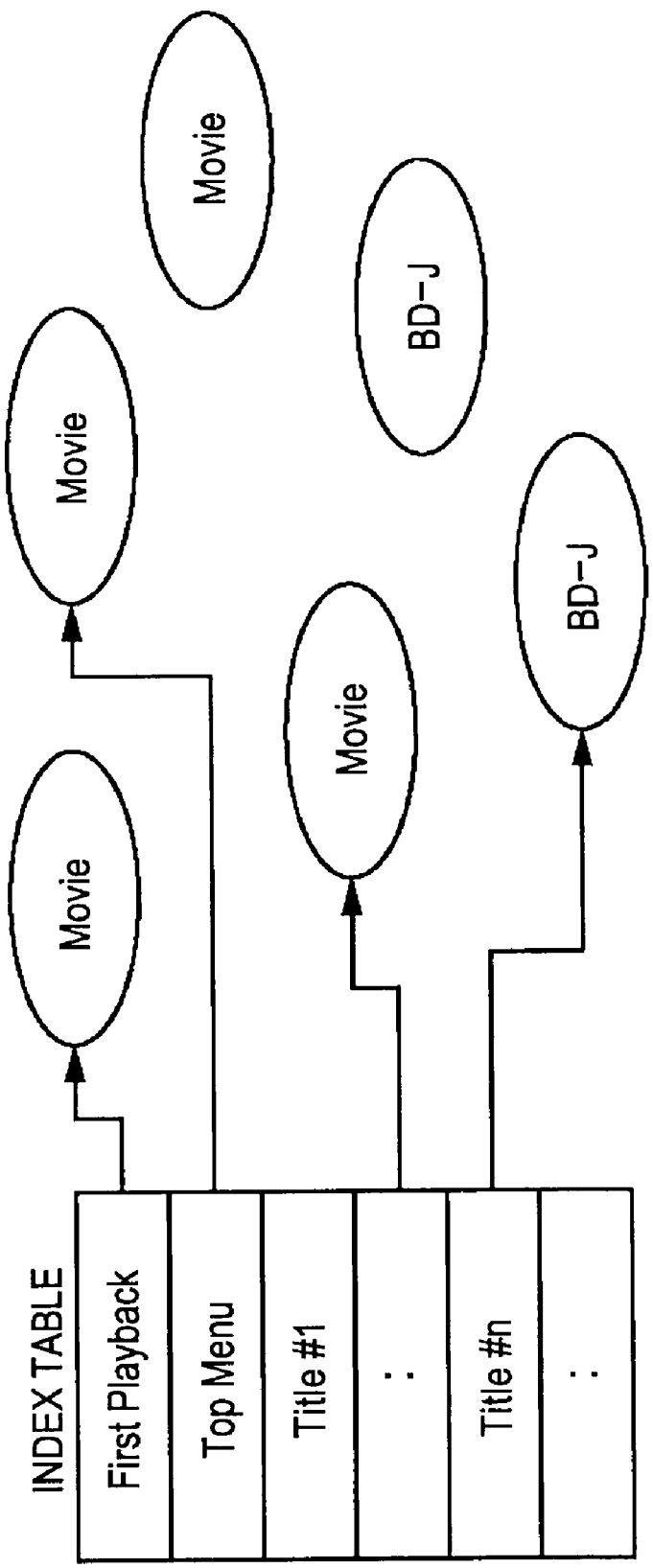
FIG. 7 is a schematic diagram for describing an index table.

The index table is a top-level table that defines titles in the BD-ROM. On the basis of title information stored in the index table, playing of the BD-ROM is controlled by a module manager in system software residing in the BD-ROM. That is, as schematically shown in FIG. 7, an arbitrary entry in the index table is called a title. A first playback, top menu, and titles #1, #2, . . . entered in the index table are all titles. Each title provides a link to a movie object or a BD-J object. Each title indicates a high-definition movie (HDMV) title or a BD-J title.

For example, when content stored in the BD-ROM is a movie, the first playback is a trailer which is an advertisement for a movie company and which is displayed prior to the main part of the movie. The top menu is, when the content is a movie, for example, a menu screen for selecting playback of the main part, chapter search, subtitles and language settings, playback of special features, and the like. Individual titles are video images selectable from the top menu. Further, a title can be configured as another menu screen.

Figure 8:
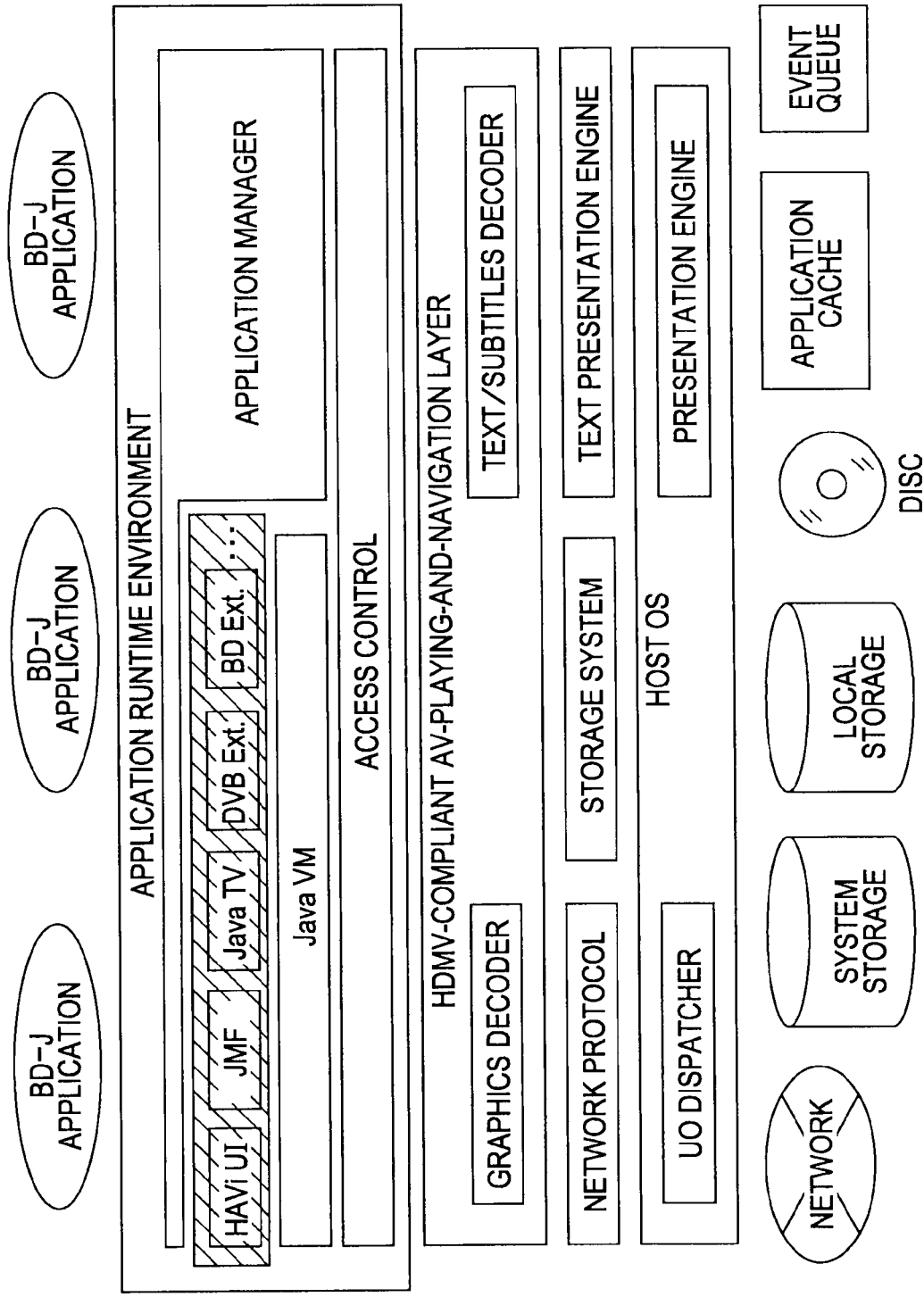
FIG. 8 is a schematic diagram showing the outline of a system model for executing a Blu-ray Disc Java (Java is registered trademark of Sun Microsystems) (BD-J) object.

FIG. 8 schematically shows a system model for executing a BD-J object. A BD-J system model has a hierarchical structure. The bottom layer includes data sources and command sources such as a network, system storage, local storage, disc (BD-ROM), application cache, and event queue (called "storage layer" for convenience). A host operating system (OS) is configured in the second layer from the bottom (called "host layer" for convenience). The host layer includes a user operation (UO) dispatcher that accepts user operations and a presentation engine that controls displaying of still and video images and text. The host layer acts as an intermediary between hardware including the bottom storage layer and applications in an upper layer and controls the hardware and the applications.

Further, the host layer controls a network protocol, a storage system, and a text presentation engine and controls communication with the network, reading and writing of data into each storage, and reading of data from the disc. By accessing a recording medium such as the disc from the host layer via the storage system, access to the recording medium such as the disc can be performed in increments of a file or in increments of the smallest recording unit.

An HDMV-compliant AV-playing-and-navigation layer is configured above the host layer. The HDMV-compliant AV-playing-and-navigation layer includes a graphics decoder that decodes image data and a text/subtitle decoder that decodes text data such as subtitles.

An application runtime environment layer is configured above the HDMV-compliant AV-playing-and-navigation layer. The application runtime environment layer configures an environment for executing the applications using Java programs in the upper layer. That is, the application runtime environment layer includes an access control unit that controls access to storage, a Java virtual machine (VM) that provides an execution environment for the host OS of Java, and an application manager that manages the Java applications in the upper layer. The application runtime environment layer further includes various application programming interfaces (APIs) and modules such as the home audio/video interoperability user interface (HAVi UI), Java media framework (JMF), JavaTV, digital video broadcasting extension (DVB Ext.), and BD extension.

A program according to the second embodiment of the present invention operates as a BD-J application in a layer above the application runtime environment layer.

Figures 9, 10:
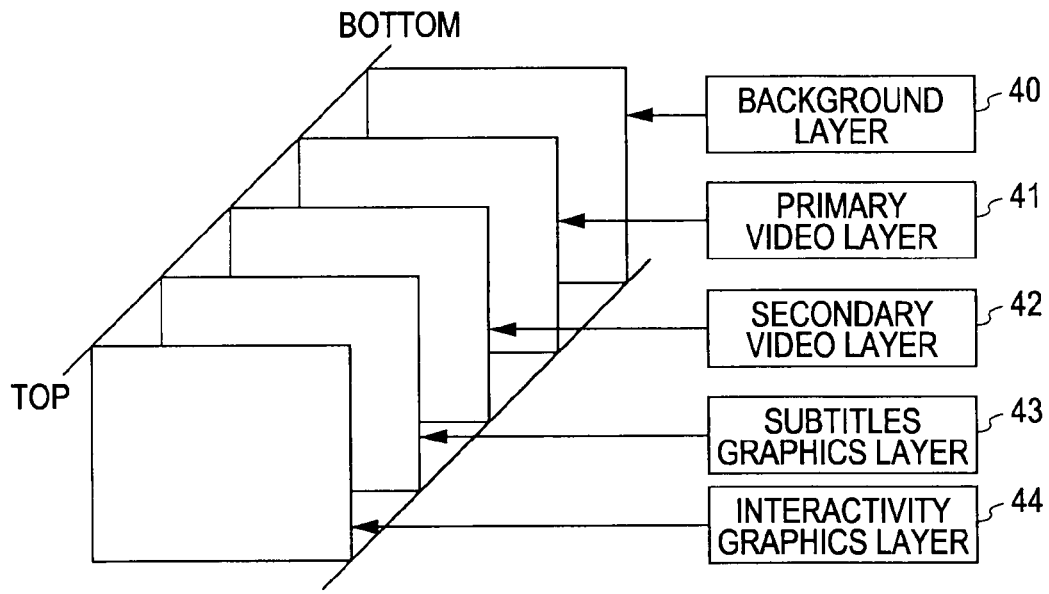
FIG. 9 is a schematic diagram showing the outline of an image display system applicable to the second embodiment.
FIG. 10 is a schematic diagram showing the structure of a chunk in a Portable Network Graphics (PNG) format.

FIG. 9 schematically shows an image display system applicable to the second embodiment of the present invention. In the second embodiment of the present invention, an image display system has a plane structure including a hierarchy of layers, an example of which is shown in FIG. 9. Starting with the back (bottom) layer, a background layer 40, a primary video layer 41, a secondary video layer 42, and a subtitles graphics layer 43 are sequential displayed, and an interactivity graphics layer 44 is displayed front most (top).

The background layer 40 handles a background image such as a wallpaper image. The primary video layer 41 and the secondary video layer 42 handle images (mainly image data) designated by respective playlists. One of the primary video layer 41 and the secondary video layer 42 may be displayed, or a frame of one layer may be embedded in a frame of the other layer in a predetermined manner so as to be displayed as a picture-in-picture. The subtitles graphics layer 43 handles subtitle data representing subtitles displayed during playback of a moving image. The interactivity graphics layer 44 handles character data for displaying the menu screen and graphics data such as bitmap data for displaying button images. Rendering based on the BD-J application can be performed using the interactivity graphics layer 44.

The background layer 40, the primary video layer 41, the secondary video layer 42, the subtitles graphics layer 43, and the interactivity graphics layer 44 can be individually displayed independent of one another. The primary video layer 41 and the secondary video layer 42 have a resolution of 1920 pixels×1080 lines, a data length per pixel of 16 bits, and a 4:2:2 system of a luminance signal Y and chrominance signals Cb and Cr (hereinafter called "YCbCr (4:2:2)"). The YCbCr (4:2:2) is a color system in which each pixel has an 8-bit luminance signal Y and 8-bit chrominance signals Cb and Cr, and chrominance signals Cb and Cr of two horizontal pixels constitute one item of color data. The interactivity graphics layer 44 and the subtitles graphics layer 43 have a resolution of 1920 pixels×1080 lines, and the sampling depth of each pixel is 8 bits. The color system of the interactivity graphics layer 44 and the subtitles graphics layer 43 is an 8-bit color map address system using a palette of 256 colors.

The interactivity graphics layer 44 and the subtitles graphics layer 43 can perform alpha blending in 256 steps. At the time of combination with other planes, the opacity can be set in 256 steps. The opacity can be set in increments of a pixel.

Hereinafter, the opacity α is indicated within the range (0≦α≦1) where the opacity α=0 indicates complete transparency and the opacity α=1 indicates complete opaqueness.

The interactivity graphics layer 44 and the subtitles graphics layer 43 handle image data in the PNG format, for example. The sampling depth of one pixel defined by the PNG format ranges from 1 bit to 16 bits. When the sampling depth is 8 bits or 16 bits, an alpha channel, that is, opacity information of individual pixel components (called "alpha data"), can be attached. When the sampling depth is 8 bits, the opacity can be designated in 256 steps. Alpha blending is performed using the opacity information based on the alpha channel. Further, palette images of up to 256 colors can be used, and an index number indicates the ordinal number of an element (index) in a prepared pallet.

FIGS. 10, 11A, and 11B schematically show the file structure of image data in the PNG format. A PNG image file containing a plurality of bulks of data having a structure called "chunk". FIG. 10 shows the structure of a chunk. A chunk contains four items of data, a data size of a data portion, a chunk name, a data sequence, and a cyclic redundancy check (CRC) check value. The positions of these items of data are specified on the basis of offsets from the head of the chunk. The data size has a data length of 4 bytes and defines the data size of a data sequence portion. The chunk name has a data length of 4 bytes, and the name of the chunk is written with ASCII code. The data sequence has a variable data length, and actual data is stored therein. The CRC check value has a data length of 4 bytes and is used to check the validity of the data in the chunk.

FIGS. 11A and 11B show an exemplary structure of a PNG image file. A PNG image file includes, as shown in FIG. 11A, a PNG signature, an IHDR chunk, a PLTE chunk, an IDAT chunk, an IEND chunk, two ancillary chunks, and, if necessary, additional chunks.

Referring to FIG. 11B, a PNG signature is an identifier of the PNG image and stores an 8-byte sequence for identifying a PNG image. An IHDR chunk is an image header and stores important data of the overall image, such as the image size and bit depth of the PNG image. An ancillary chunk placed after the IHDR chunk contains one or a plurality of chunks relating to displaying colors, such as a gamma value and a chroma of the PNG image. A PLTE chunk stores a palette in which an element is designated using an index number, as described above. The PLTE chunk is critical in an index color mode. The next ancillary chunk containing one or a plurality of chunks relating to displaying transparent colors or the like. The next additional chunk is optional and is not critical. An IDAT chunk is image data and stores a compressed and encoded image data sequence. A plurality of IDAT chunks may exist in one PNG image file. An IEND chunk marks the end of the PNG image file and has a data length of 0.

In this manner, a PNG image file represents data storage positions not using offsets, but using a chunk structure, and hence, is highly expandable. For example, an image is split on a two-dimensional plane of the image into blocks having a predetermined size, and IDAT chunks are formed in the individual blocks, whereby access can be gained to data in a desired portion of the image without decoding the PNG image. That is, when the above-described gigantic image data 20 is recorded as a PNG image file in a recording medium, access can be gained to the display data block 21 in the gigantic image data 20 without reading and decoding the whole PNG image file from the recording medium.

Note that image data handled by the interactivity graphics layer 44 and the subtitles graphics layer 43 is not limited to that in the PNG format. Alternatively, image data compressed and encoded in other compression and encoding schemes, such as the JPEG scheme, runlength-compressed image data, and bitmap data which has not been subjected to compression and encoding can be handled.

Figure 12:
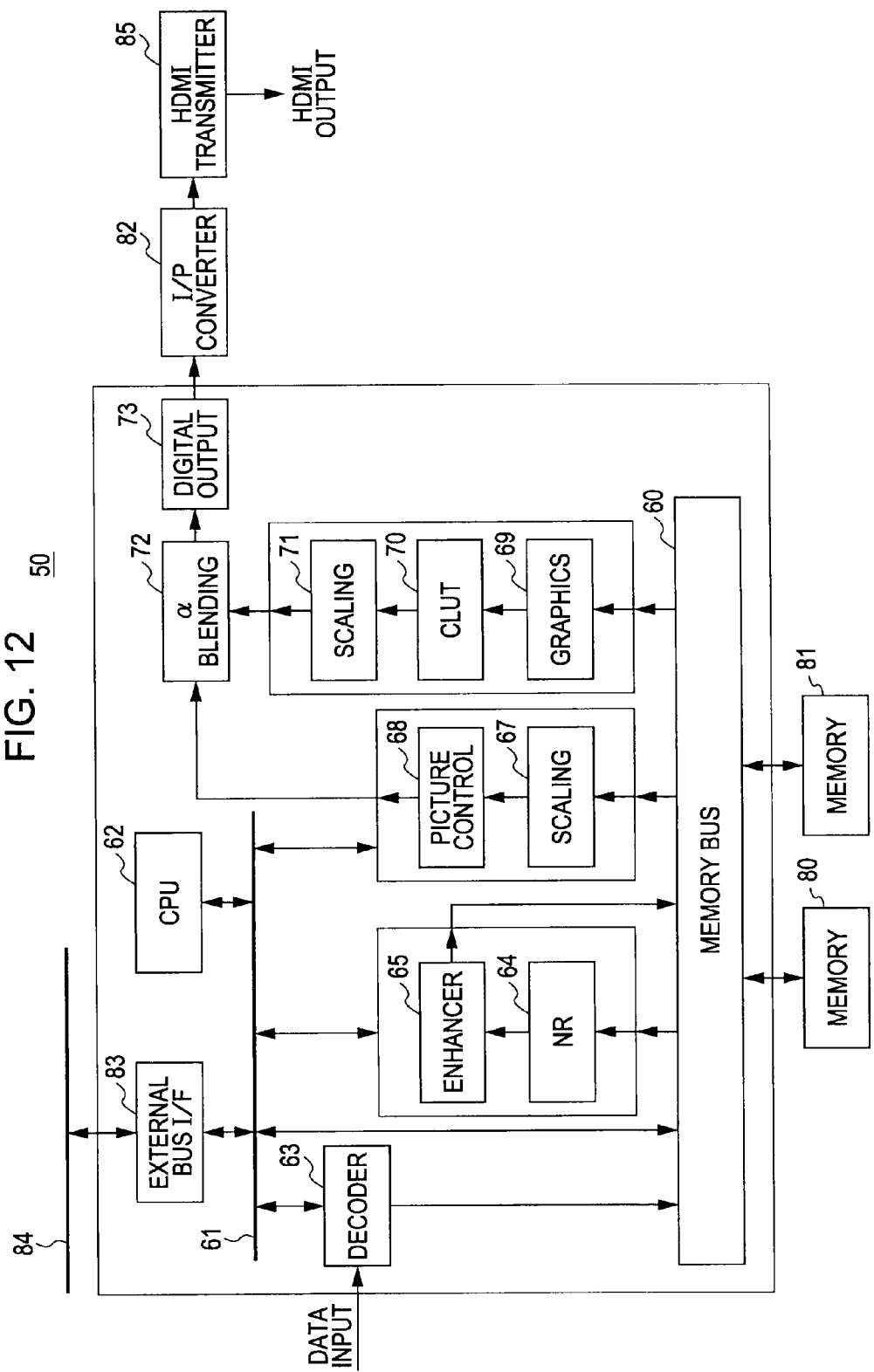
FIG. 12 is a block diagram showing the structure of an exemplary playing apparatus applicable to the second embodiment.

FIG. 12 shows an exemplary structure of a playing apparatus 50. The playing apparatus 50 corresponds to the BD player 31 described using FIG. 5. The playing apparatus 50 reproduces video streams and audio streams and executes a Java program recorded in the disc 30 based on the BD-ROM standard, which is loaded into a drive unit (not shown in the drawings).

The playing apparatus 50 contains two buses, a memory bus 60 and a central processing unit (CPU) bus 61. The playing apparatus 50 is connected via the CPU bus 61 and an external bus interface (I/F) 83 to an external bus 84. A CPU 62 is connected to the CPU bus 61.

The CPU 62 uses a random access memory (RAM), which is not shown in the drawings, as a work memory, executes a program stored beforehand in a ROM, which is not shown in the drawings, sends commands to individual units included in the playing apparatus 50 via the CPU bus 61, receives status signals and the like from the individual units, and controls the operation of the playing apparatus 50. The host OS, network protocol, storage system, and text presentation engine described using FIG. 7 are configured by using programs running on the CPU 62. Similarly, the access control unit, Java virtual machine, application manager, and APIs included in the application runtime environment layer are also configured by using programs running on the CPU 62.

The memory bus 60 is connected to memories 80 and 81. Data is exchanged via the memory bus 60 between these memories 80 and 81 and the individual units included in the playing apparatus 50.

A decoder 63 receives input data reproduced from a BD-ROM loaded in a drive unit, which is not shown in the drawings, and decodes the input data in a predetermined manner. The data decoded by the decoder 63 is distributed according to the type of data, for example. The decoded data is written into the memory 80 or 81 via the memory bus 60 or supplied to the CPU 62 via the CPU bus 61.

For example, when the decoded data is still image data or video data, the decoded data is written into the memory 80 or 81 via the memory bus 60. Alternatively, when the decoded data is a Java program for executing a BD-J application or an index table, movie object command, or playlist for performing playback control of a title, the decoded data is supplied to the CPU 62 via the CPU bus 61. The data supplied to the CPU 62 is written into, for example, the RAM, which is not shown in the drawings.

The image data written into the memory 80 or 81 is subjected to noise elimination using a noise reduction (NR) block 64 and to image-quality correction using an enhancer 65, and the processed data is written into the memory 80 or 81 via the memory bus 60.

The video data written into the memory 80 or 81 is supplied from the memory bus 60 via a scaling unit 67 to a picture control unit 68, processed in a predetermined manner, and supplied to an α blending unit 72. Still image data such as an image material is written as, for example, a PNG image file in the memory 80 or 81. This PNG image file is supplied via a graphics unit 69 to a color lookup table (CLUT) 70. Reference is made to the index number, and the PNG image file is converted into RGB data, and supplied via a scaling unit 71 to the α blending unit 72. The scaling unit 71 converts the data into interlaced data (the example in which the whole signal processing is based on interlacing is described here). The CLUT 70 extracts data α of an alpha channel indicating the opacity.

The α blending unit 72 blends the image data supplied from the picture control unit 68 and the image data supplied from the scaling unit 71 and outputs the blended image data. At this time, on the basis of the data α of the alpha channel extracted by referring to the CLUT 70, the opacity of the image data supplied from the scaling unit 71 is set, and blending is performed.

The image data output from the α blending unit 72 is output in synchronization with a vertical synchronization signal from a digital output unit 73 and supplied to an interlace/progressive (I/P) converter 82. The I/P converter 82 converts interlaced data to progressive data (called "I/P conversion"). For example, the I/P converter 82 converts 1080I-based input data into 1080P-based data and outputs the 1080P-based data. The image data output from the I/P converter 82 is supplied to an HDMI transmitter 85. The HDMI transmitter 85 converts the supplied image data into a signal in a transmission format based on the HDMI standard and outputs the signal.

Figure 13:
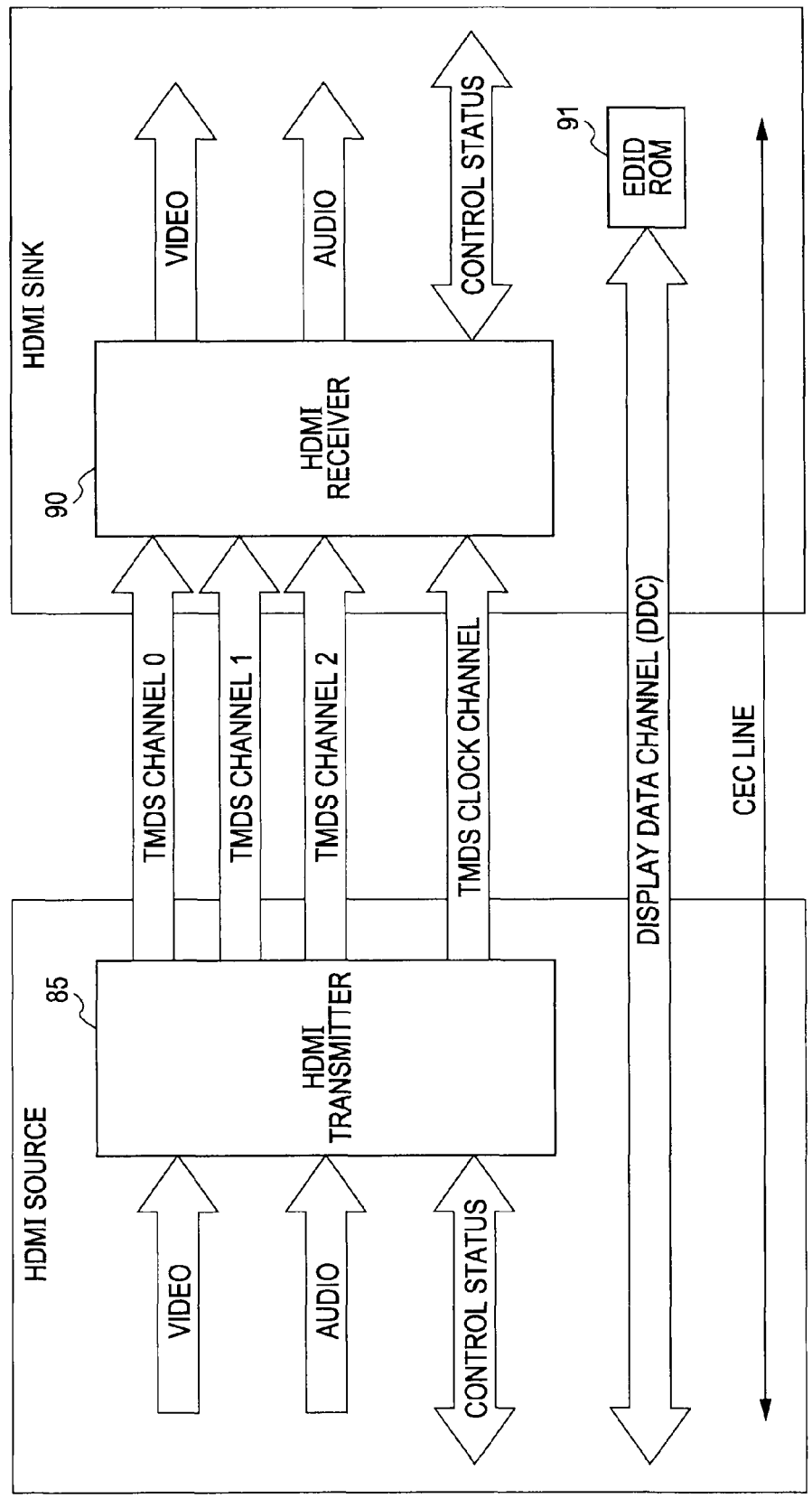
FIG. 13 is a schematic diagram showing the outline of communication performed between an HDMI transmitter and a HDMI receiver that receives HDMI signals.

FIG. 13 schematically illustrates communication performed between the HDMI transmitter 85 and an HDMI signal receiver (HDMI receiver 90). The HDMI receiver 90 is mounted on, for example, a monitor device. A video data signal is transmitted from the HDMI transmitter 85 using transition minimized differential signaling (TMDS) channels 0 to 2 and received at the HDMI receiver 90. In addition, a clock signal is transmitted from the HDMI transmitter 85 using a TMDS clock channel and received at the HDMI receiver 90. On the basis of the received signals, the HDMI receiver 90 generates and outputs video data and audio data.

The monitor device includes a ROM 91 storing information unique to the monitor device, such as the name of a vender, serial number, and resolution. The playing apparatus 50 which is the HDMI signal transmitter communicates with the monitor device using a display data channel (DDC) and obtains the information unique to the monitor device, which is stored in the ROM 91. DDC is transmitted using cables common to the above-described TMDS channels 0 to 2 and TMDS clock channel.

The data format of the information unique to the monitor device is defined as extended display identification data (EDID). FIGS. 14 to 16 show a data format defined in EDID. 00h which is the first address ("h" indicates that the immediately preceding 2-digit number is a hexadecimal number) is a header. Items of vender and product information are stored at addresses 08h to 11h. Version information and the like of the EDID structure are stored at addresses 12h and 13h. Items of basic information of the monitor device, such as the horizontal size and the vertical size of an effective display region, are stored at addresses 14h to 18h. Items of information relating to colors are stored at addresses 19h to 22h. Items of timing information unique to the monitor device, such as the range of vertical synchronization frequencies and horizontal synchronization frequencies and the number of displayable pixels, are stored at addresses 23h to 25h. Items of support information of a standard number of pixels are stored at addresses 26h to 34h. Items of detailed information are stored at addresses 36h to 0Ch. An extension flag is stored at address 11h. A checksum is stored at address 12h.

FIG. 17 shows an example in which this EDID is read by using software. It is clearly understood from FIG. 17 that, with regard to the monitor device, information relating to the manufacturer and electrical characteristics, information relating to color characteristics, information relating to timing characteristics, and support information of the standard number of pixels have been read.

Figure 18:
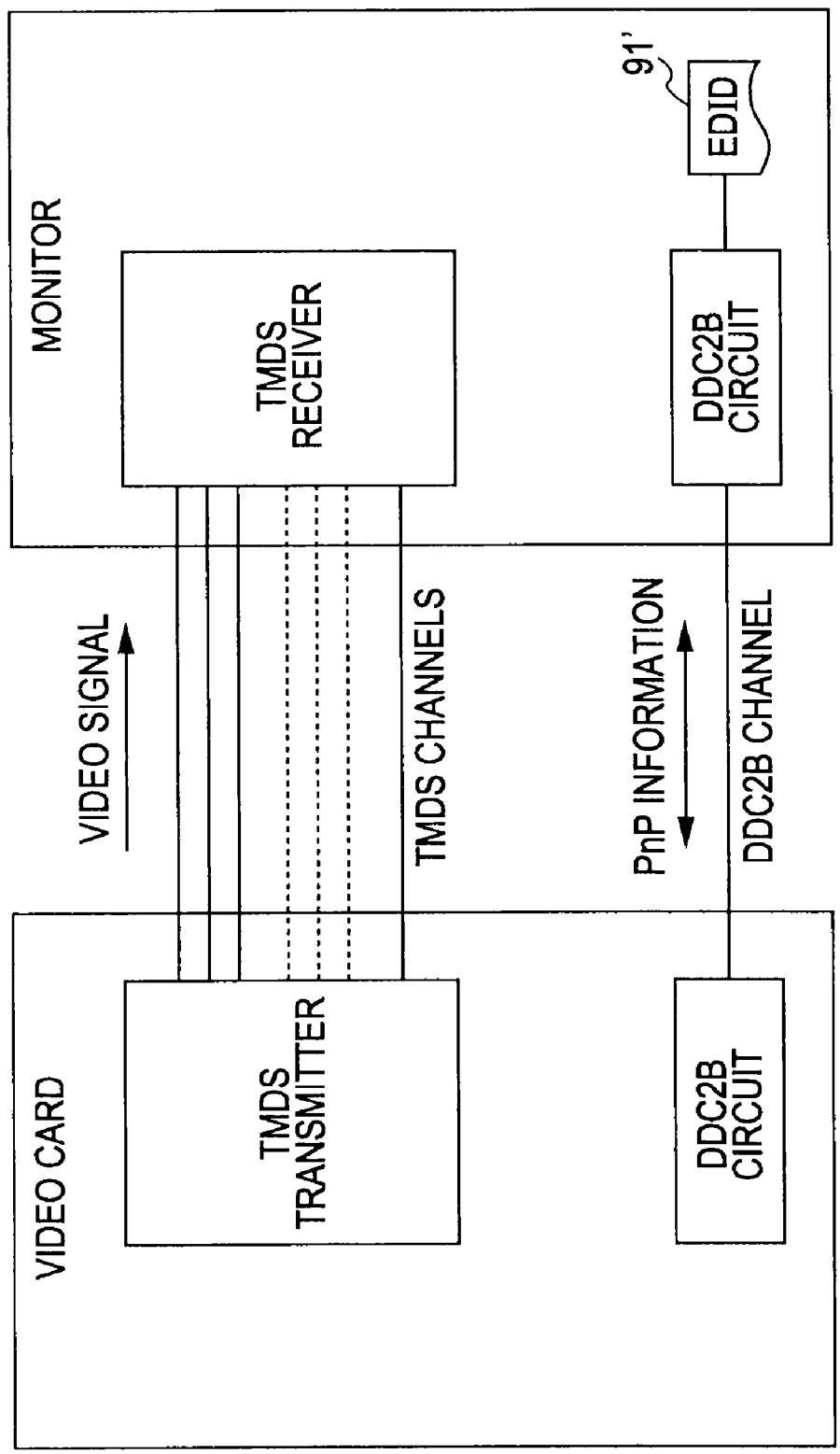
FIG. 18 is a schematic diagram showing the obtaining of EDID information by using digital visual interface (DVI) connection.

Note that the obtaining of information unique to the monitor device using the EDID is not limited to connection based on HDMI and is widely adopted by general monitor devices using, for example, liquid crystal displays (LCDs). As with an example shown in FIG. 18, a video signal is transmitted through TMDS channels to a monitor device. In addition, Plug and Play (PnP) information is exchanged between a video card and the monitor device via a display data channel standard level 2B (DDC2B) channel. At the time of this data exchange, EDID information stored in a ROM 91' included in the monitor device is read and transmitted to the video card side.

According to the embodiments of the present invention, as has been described in the first embodiment, at the time of movement of a display data block in gigantic image data, movement in increments of a pixel is performed in synchronization with a vertical synchronization signal for display. In the second embodiment, the principle of a process of performing movement in increments of a pixel in synchronization with the vertical synchronization signal will be schematically described using FIG. 19.

Figure 19:
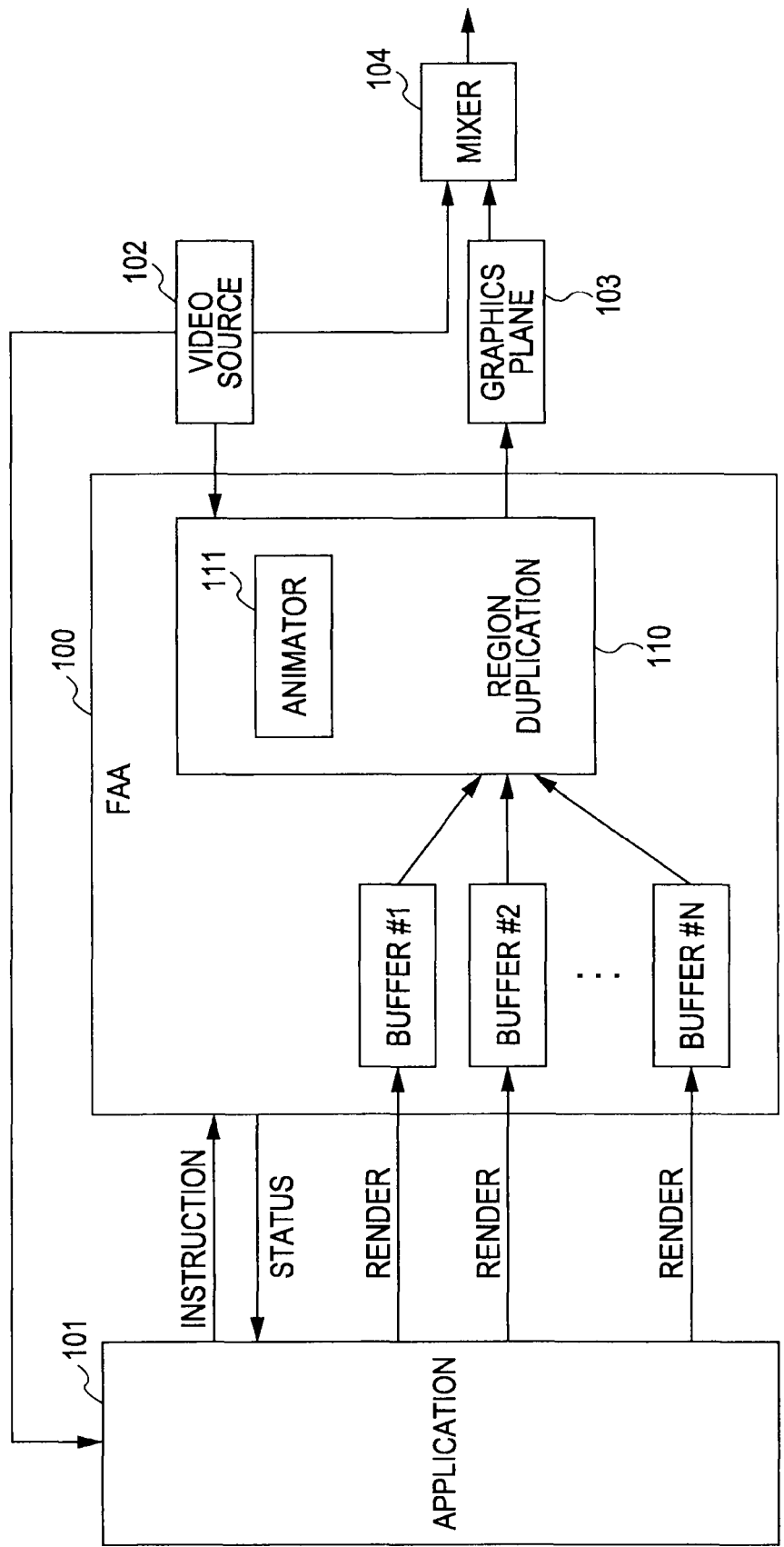
FIG. 19 is a functional block diagram for describing the principle of a process of performing movement in increments of a pixel in synchronization with a vertical synchronization signal.

FIG. 19 is a functional block diagram of an exemplary structure for displaying an animated cartoon in synchronization with video frames. In a frame accurate animation (FAA) unit 100, buffer images #1, #2, . . . , #N for displaying an animated cartoon are individually copied to a region duplication unit 110 in synchronization with a frame signal that defines a frame timing of video data. For example, the region duplication unit 110 includes a memory and writes the supplied buffer images #1, #2, . . . , #N into the memory. At the same time, the frame signal for defining the frame timing of the video data is also supplied from a video source 102 to the region duplication unit 110.

In response to a command from an application 101 in an upper layer, an animator 111 outputs, in synchronization with the frame signal supplied from the video source 102, the buffer images #1, #2, . . . , #N, which are copied to the region duplication unit 110, in the sequence in which they are to be displayed in the animated cartoon. The animated image output from the region duplication unit 110 is supplied via a graphics plane 103 to a mixer 104, combined with video data supplied from the video source 102, and output.

Figure 20:
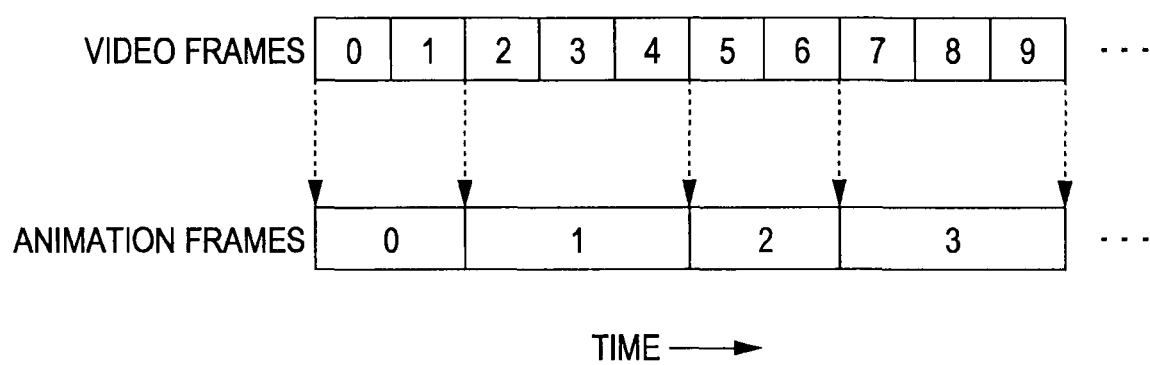
FIG. 20 is a schematic diagram for describing the principle of the process of performing movement in increments of a pixel in synchronization with the vertical synchronization signal.

Since the animated cartoon is displayed in synchronization with the frame signal of the video data, as an example is shown in FIG. 20, the updating of animation frames is performed in synchronization with the updating of video frames, thereby displaying a visually smooth animated cartoon. Alternatively, for example, when the application 101 designates display intervals between the animation frames, an animated cartoon synchronized with video frames can be displayed on the basis of the designated display intervals.

In the structure shown in FIG. 19, it is assumed that the frame signal supplied from the video source 102 to the region duplication unit 110 is a signal synchronized with the vertical synchronization signal of the video signal output to the monitor device. It is also assumed that the images #1, #2, . . . , #N for displaying an animated cartoon serve as the display data block at respective positions in the case where the display data block is moved in increments of a pixel within the gigantic image data. Accordingly, when the display data block is moved in increments of a pixel within the gigantic image data, movement of the display data block can be synchronized with the vertical synchronization signal of the video signal output to the monitor device.

That is, an image file storing gigantic image data and a BD-J application including a Java program for causing the playing apparatus 50 to execute the process described using the flowchart shown in FIG. 3 in the first embodiment are recorded in the disc 30 based on the BD-ROM standard. The BD-J application enables, for example, a predetermined region of the gigantic image data recorded as a file in the disc 30 to be displayed on the monitor, and the displayed region to be moved in accordance with a user operation.

When the disc 30 is loaded into a drive unit, which is not shown in the drawings, of the playing apparatus 50, for example, the disc 30 is played by the playing apparatus 50, and the BD-J application is read and written into the RAM, which is not shown in the drawings and which is the work memory for the CPU 62. At the same time, the playing apparatus 50 obtains information unique to the monitor device 32, which is stored in the EDID format in the ROM 91, by performing DDC-based communication using a communication unit, which is not shown in the drawings. The playing apparatus 50 obtains, from the unique information, information indicating, for example, the vertical synchronization frequency of the monitor device 32 and the scanning type that can be handled (interlace or progressive). When the monitor device 32 supports the progressive scanning, it is regarded that the movement of the display data block in the gigantic image data in increments of a pixel in synchronization with the vertical synchronization signal according to the embodiments of the present invention is effective.

When it is determined that the monitor device 32 supports the progressive scanning on the basis of the information unique to the monitor device 32, the process described using the flowchart shown in FIG. 3 is performed by using the structure described using FIG. 19. The structure described using FIG. 19 can be realized, for example, using the CPU 62, the memory 80 or 81, and the graphics unit 69. The process described using the flowchart shown in FIG. 3 is executed by the CPU 62.

That is, the CPU 62 accesses the gigantic image data file recorded in the disc 30 in accordance with the BD-J application read from the disc 30, reads data at a predetermined position in the gigantic image data file, and measures the reading time Rt (step S10 in FIG. 3). Subsequently, the CPU 62 reads data that is designated to be displayed on the monitor device 32, includes the display data block 21, and is equivalent to the first decodable portion from the gigantic image data file (step S11 in FIG. 3).

The read data is decoded by the decoder 63 and written via the memory bus 60 into, for example, the memory 80. Thereafter, the rendering position X is determined for the data written into the memory 80 (step S12 in FIG. 3), and rendering of the data equivalent to the display data block 21 is performed in synchronization with the vertical synchronization signal of the video signal output to the monitor device 32 (step S13 in FIG. 3). In response to a movement instruction, the rendering position X is displaced n pixels (step S14 in FIG. 3). When it is determined that the new rendering position X is the position at which it is not necessary to read data equivalent to the second decodable portion (step S15 in FIG. 3), the next rendering is performed in synchronization with the vertical synchronization signal of the video signal output to the monitor device 32.

Hereinafter, the process from step S16 in FIG. 3 onward, that is, determination as to whether to read data equivalent to the second decodable portion (step S16 in FIG. 3), determination of, when data equivalent to the second decodable portion is read from the gigantic image data file recorded in the disc 30 (step S17 in FIG. 3), the rendering position X of the display data block 21 on the basis of the data equivalent to the second decodable portion (step S19 in FIG. 3), and rendering in synchronization with the vertical synchronization signal at the determined rendering position X (step S20 in FIG. 3), is similarly performed.

Note that it has been described above that a region of gigantic image data to be displayed (display data block) is moved in the horizontal direction. However, this is not limited to the foregoing example. That is, the display data block can be moved in the vertical direction or diagonal direction with respect to the gigantic image data. Further, it has been described above that movement of the display data block is performed in increments of a pixel. In this case, however, movement can be performed not only in increments of one pixel, but also in increments of multiple pixels, such as two pixels or three pixels, or in increments of a variable number of pixels. Accordingly, the movement speed of a displayed image can be changed.

Further, it has been described above that gigantic image data which has been compressed and encoded is recorded in a recording medium. However, this is not limited to the foregoing example. That is, the embodiments of the present invention are applicable to the case where gigantic image data which has not been compressed or encoded, such as data in the bitmap format, is recorded in a recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus that displays, on a display region having a first number of pixels, an image represented by gigantic image data that is recorded in a recording medium and has a second number of pixels that is significantly greater than the first number of pixels, comprising:
 a reproducing unit configured to read image data from the recording medium;
 an output unit configured to output the image data, which is read by the reproducing unit from the recording medium, in synchronization with a vertical synchronization signal; and
 a control unit configured to control the reproducing unit and the output unit, wherein
 the control unit performs control to extract and read a region corresponding to the display region from the gigantic image data recorded in the recording medium, and
 the control unit performs movement in increments of a pixel in synchronization with the vertical synchronization signal when a region for display on the display region is moved in the gigantic image data.

2. The image processing apparatus according to claim 1, further comprising:
 a storage unit configured to be capable of storing at least two planes of image data having a third number of pixels that is less than the second number of pixels and greater than the first number of pixels, wherein
 the control unit performs control to read, from the gigantic image data recorded in the recording medium, a region that has the third number of pixels and includes a region having the first number of pixels for display on the display region.

3. The image processing apparatus according to claim 2, wherein, when the region for display on the display region is moved in the gigantic image data, the control unit reads, in accordance with the movement, from the gigantic image data recorded in the recording medium, another region that has the third number of pixels and is adjacent, in a direction of the movement, to the region which has the third number of pixels and includes the region for display on the display region, and stores the other region in the storage unit.

4. The image processing apparatus according to claim 3, wherein the control unit reads another region having the third number of pixels from the gigantic image data recorded in the recording medium when the region for display on the display region exceeds a predetermined position in the region which has the third number of pixels and is stored in the storage unit.

5. The image processing apparatus according to claim 4, wherein the control unit determines the predetermined position on the basis of a measurement result of measuring in advance a reading time involved in reading, from the recording medium, a region having the third number of pixels in the gigantic image data.

6. The image processing apparatus according to claim 1, wherein the control unit obtains information unique to a display device connected to the output unit and, when the obtained unique information indicates that the display device supports progressive scanning, performs the movement in increments of a pixel in synchronization with the vertical synchronization signal.

7. The image processing apparatus according to claim 1, further comprising:
  a video signal transmitter configured to convert the image data output from the output unit into a video signal in a predetermined format and to output the video signal; and
  a converter configured to convert interlaced image data into progressive image data using a 2:2 pull-down scheme,
  wherein the converter is provided at a previous stage of the output unit.

8. The image processing apparatus according to claim 1 or 2, wherein the gigantic image data which has been subjected to compression and encoding is recorded in the recording medium.

9. The image processing apparatus according to claim 8, wherein the compression and encoding is performed in increments of a block, the block being one of blocks obtained by splitting the gigantic image data into predetermined size blocks.

10. The image processing apparatus according to claim 8, wherein the compression and encoding is performed by performing compression and encoding of the gigantic image data in increments of a chunk.

11. An image processing method comprising:
  extracting and reading, by a decoder, a region corresponding to a display region having a first number of pixels from gigantic image data having a second number of pixels that is significantly greater than the first number of pixels;
  outputting image data included in the read region in synchronization with a vertical synchronization signal; and
  performing movement in increments of a pixel in synchronization with the vertical synchronization signal when a region for display on the display region is moved in the gigantic image data.

12. An image processing program embodied on a non-transitory computer readable medium for causing an apparatus to execute an image processing method comprising:
  extracting and reading a region corresponding to a display region having a first number of pixels from gigantic image data having a second number of pixels that is significantly greater than the first number of pixels;
  vertical outputting image data included in the read region in synchronization with a vertical synchronization signal; and
  performing movement in increments of a pixel in synchronization with the vertical synchronization signal when a region for display on the display region is moved in the gigantic image data.

* * * * *